Sept. 21, 1954    J. BOLSEY    2,689,509
RANGE FINDER FOR CAMERAS
Filed Oct. 5, 1948    3 Sheets-Sheet 1
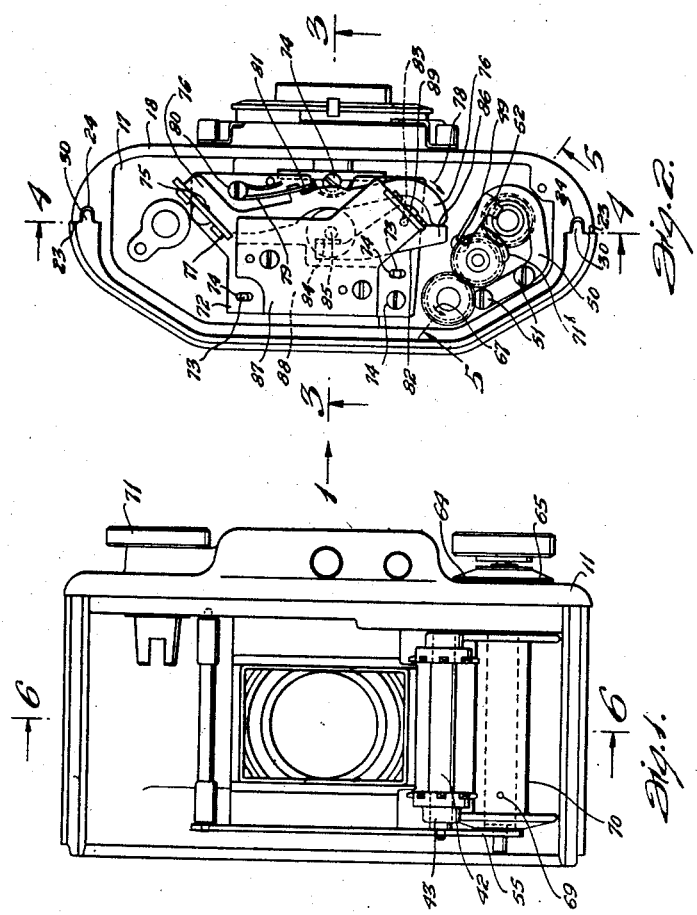
INVENTOR.
Jacques Bolsey
BY Sept. 21, 1954         J. BOLSEY                2,689,509
                  RANGE FINDER FOR CAMERAS
Filed Oct. 5, 1948                          3 Sheets-Sheet 2
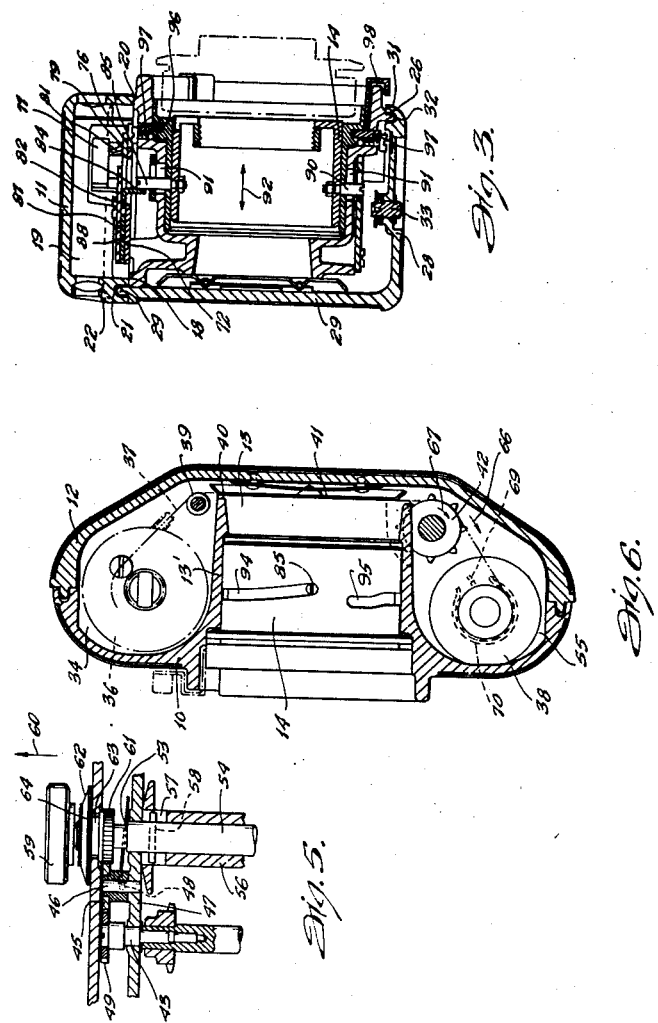
INVENTOR.
BY Jacques Bolsey Sept. 21, 1954  J. BOLSEY  2,689,509
RANGE FINDER FOR CAMERAS
Filed Oct. 5, 1948  3 Sheets-Sheet 3
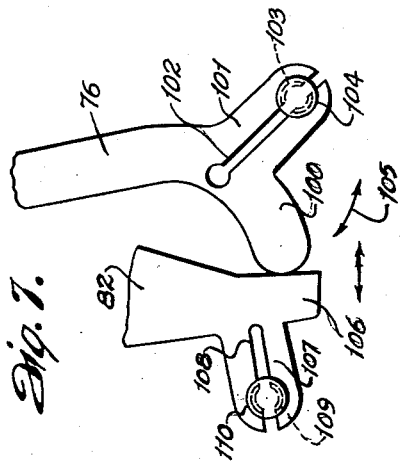
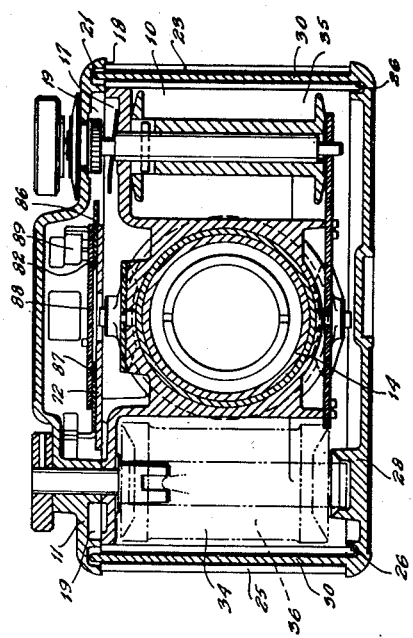
INVENTOR.
Jacques Bolsey
BY Patented Sept. 21, 1954

2,689,509

UNITED STATES PATENT OFFICE 2,689,509

RANGE FINDER FOR CAMERAS

Jacques Bolsey, New York, N. Y.

Application October 5, 1948, Serial No. 52,930

4 Claims. (Cl. 95—44)

My present invention relates to range finders.

This application is a continuation-in-part of U. S. patent application Serial Number 779,301, filed October 11, 1947, and entitled "Photographic Cameras," which matured into Patent Number 2,508,095.

It is an object of my present invention to provide a range finder which is extremely simple in construction, but nevertheless, reliable in operation.

It is also an object of my present invention to provide a range finder unit which can be easily mounted on a camera of any desired type, and removed therefrom for repairs or replacement, if necessary, in an extremely easy manner.

With the above objects in view, my present invention mainly consists of a range finder for a camera provided with a slidable camera lens comprising in combination a base member, a first lever, first pivoting means turnably pivoting the first lever to the base member, operating means movable by sliding of the camera lens in direction of its optical axis and adapted to engage the first lever so as to turn it about the first pivoting means, a second lever, second pivoting means pivoting the second lever to the base member in such a manner that the second lever engages the first lever and is turned by the same about the second pivoting means when the first lever is turned by the operating means about the first pivoting means, a turnable mirror mounted on the second lever turnably together with the same, and a stationary mirror mounted on the base member spaced from the turnable mirror substantially parallel to the same.

A particularly preferred range finder arrangement according to my present invention is used in combination with a camera having a camera body, and a slidable camera lens and comprising in combination a base plate, screw and slot means securing the base plate to the camera body adjustably in the plane of the base plate, a double armed flat lever, first pivoting means pivoting the double armed flat lever to the base plate turnably in a plane parallel to the base plate operating means movable by sliding of the slidable camera lens in direction of its optical axis and adapted to engage one lever arm of the double armed flat lever so as to turn the double armed flat lever about the first pivoting means in a plane parallel to said base plate, a single armed flat lever, second pivoting means pivoting the single armed flat lever at one end to the base plate turnably in a plane parallel to the base plate in such a manner that the single armed flat lever engages with its other end the other lever arm of the double armed flat lever, and is turned by the same in a plane parallel to the base plate about the second pivoting means when the double armed flat lever is turned by said operating means about the first pivoting means in a plane parallel to the base plate, spring means mounted on the base plate and engaging the single armed flat lever so as to permanently force the single armed flat lever, and by means of the same also the double armed flat lever to turn against their direction of turning caused by the operating means, a turnable mirror mounted on the single armed flat lever normal to the plane of the same in such a manner that the axis of turning of the second pivoting means is located in the surface plane of the turnable mirror and a stationary mirror mounted on the base plate normal the same, spaced from the turnable mirror and substantially parallel to the same, and screw and slot means combined with at least one of the flat levers for adjusting the shape of the respective flat lever in the plane of the same.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a rear view of my new camera with the cover removed, seen in direction of arrow 1 of Figure 2;

Fig. 2 is a top view of the camera shown in Figure 1, with the top member of the camera removed, seen in direction of arrow 2 of Figure 1;

Fig. 3 is a cross section through the camera shown in Figures 1 and 2, along line 3—3 of Figure 2;

Fig. 4 is a longitudinal elevational section through the camera shown in Figures 1 to 3, along line 4—4 of Figure 2;

Fig. 5 is a fragmentary elevational section through the transporting and counter mechanism of the camera shown in Figures 1 to 4, along line 5—5 of Figure 2;

Fig. 6 is a longitudinal plane section through the camera shown in Figures 1 to 4, along line 6—6 of Figure 1; and Fig. 7 is a partial top view of modified flat levers forming part of the range finder according to my present invention, and provided with shape adjusting means.

My new camera contains as main elements a camera body 10, a camera top 11, and a detachable camera cover 12.

The camera body 10 is provided with a central cylindrical compartment 13 into which the lens barrel 14 fits, carrying in usual manner the lens 15, and the shutter mechanism 16.

This camera body 10 is provided, as clearly shown in Figure 2, at its top, with a compartment 17 surrounded by the flat rim 18.

Furthermore, the camera body 10 is provided along its two lateral vertically extending edges 23 with U-shaped grooves 24, as shown in Figures 1 and 2.

Finally, the camera body is also provided along its bottom edge 25 with a longitudinal projection 26 as shown in Figure 3.

The top member 11 mentioned above contains also a compartment 19 forming together with the compartment 17 in the camera body 10 a large combined compartment. Furthermore, the top member of the camera is provided along its front edge with a flat rim 20 having the same shape as the front portion of rim 18 and adapted to fit the same. Along the rear edge of the top member 11 a U-shaped groove 21 is provided in the rim 22 of the same; this rim 22 is, as clearly shown in Figure 3, arranged so as to project rearwardly beyond the rear edge of rim 18 of the camera body 10.

The camera cover 12 is composed of a rear cover portion 27 and a bottom cover portion 28. The rear cover portion 27 is provided along its top edge with a longitudinal projection 29 adapted to fit into the corresponding U-shaped groove 21 of the top member 11, as clearly shown in Figure 3. Furthermore, the rear cover portion 27 of the cover member 11 is provided along its lateral vertically extending edges with two longitudinal projections 30 adapted to fit into the corresponding U-shaped grooves 24 provided along the lateral edges 23 of the camera body 10, as clearly shown in Figure 2.

Finally, the bottom portion 28 of the cover 12 is provided along its front edge 31 with a U-shaped groove 32 into which fits the longitudinal projection 26 arranged along the bottom edge 25 of the camera body 10, as clearly shown in Figure 3.

The camera cover 12 is secured to the camera in proper operative position covering the rear and bottom of the camera body 10 by means of a turnable closure mechanism 33 of conventional type, whenever desired.

The camera body itself is provided not only with the cylindrical compartment 13, but also with two film compartments 34 and 35. Compartment 34 contains the film spool 36 from which the film strip 37 is unwound and compartment 35 contains the take-up spool 38, upon which the film strip 37 is wound during its transportation.

During such film transportation, the film strip passes over the guiding roller 39, between the rear exposure face 40 of the camera body 10, and the pressure plate 41 of conventional design mounted on the camera cover 12, and engages before reaching the take-up spool 38 the film sprocket 42, as clearly shown in Figure 6.

This film sprocket 42 is carried by the shaft 43 freely rotatably mounted as shown in Figures 1 and 5, in openings provided in the horizontal partition wall 47 and the bottom wall 55 of the camera body 10. As shown in Figure 5, shaft 43 carries at its top end the pinion 44. This pinion 44 is in mesh with the idler pinion 45 carried by the pinion shaft 46 freely rotatably mounted on the horizontal partition wall 47 of the camera body 10. The pinion shaft 46, in turn, carries a stopping pin 48 adapted to turn together with shaft 46.

The stopping pin 48 is arranged so as to abut, as shown in Figures 2 and 5, against the end face 49 of the spring member 50 secured by means of screws 51 to the horizontal partition wall 47 of the camera body 10.

This spring 50 is provided with a projecting portion 52 engaging the annular face 53 formed on shaft 54. This shaft 54 is mounted freely turnably and slidably in axial direction in corresponding openings provided in the horizontal partition wall 47 and bottom wall 55 of the camera body 10, and carries the take-up spool 56. This take-up spool 56 is provided with longitudinal cut-outs 57 into which projects the pin 58 secured to shaft 54. This pin 58 makes it possible to turn the take-up spool 56 by turning shaft 54, independently of sliding movement of such shaft in axial direction.

Shaft 54 extends, as clearly shown in Figure 5, at its upper end through a corresponding opening in the top member 11 and is provided at its top with an operating film transporting knob 59. It is evident that by pulling knob 59 in direction of arrow 60 it is possible to bend the blocking spring 50 upwards so as to move its end face 49 out of the path of the stopping pin 48.

Shaft 54 carries also a counter pinion 61 constructed so as to have one gear tooth less than pinion 45. This pinion 61 is freely turnably and slidably mounted on shaft 54, and is in no way connected with the same so as to engage permanently, i. e. also during sliding of the shaft, the pinion 45 and to be turned by the same.

Finally, the transporting and counter-mechanism of my camera includes also a counter-disc 62 freely turnably carried by shaft 54, but connected by means of a friction coupling 63 of conventional design with the pinion 53 so as to turn together with the latter. This counter-disc 62 is provided with an indicating arrow 64 cooperating with a scale 65 arranged on the upper face of top member 11 around the counter-disc 62 and adapted to indicate the number of exposed pictures.

My new combined film transporting and counting mechanism operates as follows:

The film strip 37 is inserted as shown in Figure 6, engaging sprocket 42. If it is desired to transport the film strip 37, it is only necessary to turn knob 59 so as to pull the film in direction of arrow 66. Movement of the film strip 37 in direction of arrow 66 will result in turning of sprocket 42 in direction of arrow 67 which, in turn, will result in turning of the pinion 45, shaft 46, and stopping pin 48 in direction of arrow 68. During turning in direction of arrow 68, the stopping pin 48 will abut against the end face 49 of spring 50, and thereby stop further turning of pinion 45, pinion 44, and sprocket 42, thus preventing further transportation of the film strip 37.

In this position the film strip 37 is ready for taking a picture. After taking of the picture, it is necessary to enable further transportation of the film. This is done by pulling knob 59 in direction of arrow 60. This will result in lifting of spring 50 and disengagement of the end face 49 of the same, and the stopping pin 48.

During such disengagement, the stopping pin 48 will automatically turn a small distance in direction of arrow 68, thereby moving under or beyond the end face 49 of the spring 50. This automatic turning movement of the stopping pin is, as I have found, due to the fact that the film strip between the take-up spool 38 and sprocket 42 is under a slight tension while sprocket 42 is prevented from turning. The moment the stopping pin 48 is released, the film strip 37 under tension turns the sprocket 42 which results in turning of the pin 48 under or beyond the end face 49 of spring 50.

The knob 59 is then released, and is forced by spring 50 to return into its original position. In the meantime, as set forth above, the stopping pin 48 has moved under or beyond the end face 49 of spring 50, and is able to freely turn in direction of arrow 68 until it hits against the end face 49 of the spring 50. Such turning of pin 48 is accomplished by turning of knob 59 which will, of course, also result in turning of the take-up spool 54, and transportation of a predetermined length of film strip into exposure position.

Thus, in order to transport consecutive film portions of predetermined lengths, it is only necessary each time to turn knob 59 until such turning is blocked, then to pull it in direction of arrow 60, release it, and then turn it again.

The counter mechanism connected with the above described transportation mechanism automatically indicates the number of film portions which have been transported: This is due to the fact that during each film transporting cycle the pinion 45 turns 360° resulting in turning of pinion 61 about an angle which is slightly smaller than a complete circle. By properly arranging the lines of scale 65, it is possible to obtain by means of the indicating arrow 64 proper indication of the number of transported film portions.

The friction coupling 63 mentioned above which connects the pinion 61 with indicating disc 62 makes it possible to turn the indicating disc 62 back into its initial position at the start of operations, i. e. after insertion of a new film strip when the same is ready for taking the first picture.

In order to facilitate insertion of the film strip 37 and its proper and easy attachment to the take-up spool 54, I provide on the outer surface of this spool a sprocket pin 69 arranged so as to be adapted to engage one of the sprocket holes of the film strip. Furthermore, I secure to the take-up spool 54 a substantially cylindrical spring member 70 serving for guiding the film. I have found that if the end of the film strip is pushed under this spring member so as to be temporarily held by the same, and the take-up spool is turned, the pin 69 will enter one of the sprocket holes of the film and firmly hold the film strip.

I wish to mention that in order to enable uninterrupted rewinding of the film, i. e. transportation of the film from the take-up spool 38 upon the film spool 36 by turning knob 71, the spring 50 is bent so as not to block continuous turning of pin 48 when the same is turned against direction of arrow 68. This purpose is attained by providing a sloping extension 71' on spring 50, the end of which reaches under the path of pin 48 so that the entire spring together with the end face 49 thereof is depressed and sliding under the pin 48 without blocking the same when the pin is turned against direction of arrow 68 by rewinding of the film strip as set forth above.

My camera is equipped with a range finder arrangement of entirely new type. This range finder arrangement is a separate unit, and is mounted on a base plate 72. This base plate 72 in turn, is mounted on the bottom of the compartment 17 formed within the top surface of the camera body 10. In order to enable adjustment of the entire range finder, I provide adjusting pins 73 forming part of the camera body and sliding in longitudinal slots 74 provided in the base plate 72. The screws 74 serve for securing the base plate 72 to the camera in adjusted position. On this base plate 72, I pivot by means of the pivot 75 the flat lever 76 carrying the turnable range finder mirror 77. This lever 76 is permanently forced to turn in direction of arrow 78 by the leaf spring 79 secured by means of screw 80 to the base plate 72, and abutting against the upwardly bent portion 81 of lever 76.

Furthermore, I mount the operating lever 82 by means of the pivot 83 on the base plate 72. This operating lever 82 engages by means of its downwardly bent portion 84 the pin 85 mounted on the lens barrel 14 so as to be adapted to be turned about pivot 83 by movement of this pin. At its other end 85, the operating lever 82 contacts the end of the lever 76, and turns the same so as to adjust the position of mirror 77.

My new range finder unit also includes a stationary top plate 87 held by the space plate 88 at a slight distance from the base plate 72 so as to serve as a guide for the two levers 76 and 82. This top plate 87 also carries the stationary mirror 88.

My new range finder constructed and arranged as described above, consists of very few parts, is extremely simple to install and adjust, and is very reliable in operation.

In order to enable adjustment of the shape of the levers 76 and 82 I might provide, if desirable, adjusting means of the type shown in Figure 7.

As shown in this figure, the lever 76 is provided near its end 100 with a flat projection 101 having a slot 102. A conical screw hole 103 is provided in this flat projection 101 crossing slot 102.

For adjusting purposes, a screw 104 is screwed into the conical screw hole 103. By screwing the screw 104 to a greater or smaller extent into the conical screw hole 103, it is possible to bend the end portion 100 of lever 76 relative to the main part of the lever in direction of arrow 105, and thereby to adjust the operative point of the lever 76 which engages the lever 82.

Similarly, I have shown a part of lever 82 provided with adjusting means operating in the same manner as the adjusting means shown in Figure 7. In this figure, the end portion of lever 82 is designated with reference numeral 106, the flat projection with reference numeral 107, the slot with reference numeral 108, the conical screw threaded hole with reference numeral 109, the adjusting screw with reference numeral 110, and the arrow indicating the direction of adjustment caused by this screw with reference numeral 111.

My new camera is also equipped with an entirely new type of lens mount and means for operating the range finder:

The lens 15 together with the shutter mechanism 16 is carried by the lens barrel 14 which is provided with two radially extending pins 90 and 85. Pin 85 is relatively long, and engages, as set forth above and clearly shown in Figure 3, the downwardly bent portion 84 of the operating lever 82 forming part of the range finder arrangement described above.

The pins 85 and 90 pass through and are guided by longitudinal slots 91 provided in the cylindrical portion 13' of the camera body 10 surrounding the lens barrel 14. Thus, the lens barrel 14 is prevented from turning, but able to slide in direction of the optical axis of the camera as indicated by arrow 92.

Between the inner cylindrical surface of the cylindrical body portion 13', and the lens barrel 14, I arrange a cylindrical guiding sleeve 93 provided with two helical slots 94 and 95 through which pass the pins 85 and 90, respectively. This cylindrical guiding sleeve 93 is provided with an annular slot 96 into which project the guide plates 97 secured to the camera body 10. These guide plates 97 prevent movement of the cylindrical guiding sleeve 93 in axial direction as indicated by arrow 92, while permitting its turning about the optical axis of the lens.

At the front edge of the cylindrical guiding sleeve 93 described above, I provide a focusing lever 98. By turning of this focusing lever 98 it is possible to turn the guiding sleeve 93. Such turning movement of the guiding sleeve 93 will be transmitted by means of the helical slots 94 and pins 85 and 90 to the lens barrel 14 resulting in sliding of the same in axial direction. During such sliding movement of the lens barrel 14, the pin 85 secured thereto will operate the range finder as described above.

It will be understood that each of the elements described above, or two or more together, may also find a useful application in other types of photographic cameras, differing from the types described above.

While I have illustrated and described the invention as embodied in photographic cameras using perforated film strips, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should, and are intended to be comprehended within the meaning and range of equivalence of the following claims.

What I claim as new and desire to secure by Letters Patent is:

1. In a camera having a camera body in combination a partition wall within said camera body forming therein an exposure compartment and a range finder compartment, said partition wall having a straight slot extending parallel to the optical axis of the camera; a cylindrical guiding sleeve mounted in said exposure compartment turnable about the optical axis of the camera but non-slidable in axial direction, said cylindrical guiding sleeve having a helical slot; a camera lens barrel arranged within said cylindrical guiding sleeve supported by the same and slidable in axial direction; range finder means arranged in said range finder compartment and including a range finder adjusting member; and an operating member secured to said camera lens barrel projecting through said helical slot in said guiding sleeve and said straight slot in said partition wall into said range finder compartment and engaging in said compartment said range finder adjusting member, so that turning of said cylindrical guiding sleeve about its axis will result in simultaneous adjustment of the position of said camera lens barrel in axial direction and adjustment of said range finder means by the intermediary of the operating member mounted on said camera lens barrel and engaging said range finder adjusting member while preventing turning of said camera lens barrel about its axis.

2. In a camera having a camera body in combination a partition wall within said camera body forming therein an exposure compartment and a range finder compartment, said partition wall having a straight slot extending parallel to the optical axis of the camera; a cylindrical guiding sleeve mounted in said exposure compartment turnable about the optical axis of the camera, said cylindrical guiding sleeve having a helical slot; means on said camera body engaging said cylindrical guiding sleeve so as to prevent sliding of the same in axial direction; a camera lens barrel arranged within said cylindrical guiding sleeve supported by the same and slidable in axial direction; range finder means arranged in said range finder compartment and including a range finder adjusting member; manually operable means for turning said cylindrical guiding sleeve; and an operating pin secured to said camera lens barrel projecting through said helical slot in said guiding sleeve and said straight slot in said partition wall into said range finder compartment and engaging in said compartment said range finder adjusting member, so that turning of said cylindrical guiding sleeve by said manually operable means will result in simultaneous adjustment of the position of said camera lens barrel in axial direction and adjustment of said range finder means by the intermediary of the operating member mounted on said camera lens barrel and engaging said range finder adjusting member while preventing turning of said camera lens barrel about its axis.

3. In a camera having a camera body, in combination, a cylindrical guiding sleeve mounted in said camera body turnable about its axis but non-slidable in axial direction, said cylindrical guiding sleeve having a helical slot therein; a camera lens barrel arranged within said cylindrical guiding sleeve supported by the same and slidable in axial direction; means preventing turning of said lens barrel about its axis; range finder means arranged in said camera body and including a base plate, screw and slot means securing said base plate to said camera body adjustably in the plane of said base plate, a double armed flat lever, first pivoting means pivoting said double armed flat lever to said base plate turnably in a plane parallel to said base plate, another lever, second pivoting means pivoting said other lever to said base plate turnably in a plane parallel to said base plate in such a manner that said other lever engages a lever arm of said double armed lever and is turned by the same about said second pivoting means when said double armed lever is turned by said operating means about said first pivoting means, a turnable mirror mounted on said other lever turnably together with the same, and a stationary mirror mounted on said base plate spaced from said turnable mirror and substantially parallel to the same; and an operating member secured to said camera lens barrel projecting through said helical slot in said cylindrical guiding sleeve and engaging the other lever arm of said double armed lever, so that turning of said cylindrical guiding sleeve about its axis will result in simultaneous adjustment of the position of said camera lens barrel in axial direction and adjustment of said range finder means by the intermediary of the operating member mounted on said camera lens barrel and engaging said other lever arm of said double armed lever.

4. In a camera having a camera body in combination a partition wall within said camera body forming therein an exposure compartment and a range finder compartment, said partition wall having a straight slot extending parallel to the optical axis of the camera; a cylindrical guiding sleeve mounted in said exposure compartment turnable about the optical axis of the camera, said cylindrical guiding sleeve having a helical slot; means on said camera body engaging said cylindrical guiding sleeve so as to prevent sliding of the same in axial direction; a camera lens barrel arranged within said cylindrical guiding sleeve supported by the same and slidable in axial direction; range finder means arranged in said camera body and including a base plate, screw and slot means securing said base plate to said camera body adjustably in the plane of said base plate, a double armed flat lever, first pivoting means pivoting said double armed flat lever to said base plate turnably in a plane parallel to said base plate, another lever, second pivoting means pivoting said other lever to said base plate turnably in a plane parallel to said base plate in such a manner that said other lever engages a lever arm of said double armed lever and is turned by the same about said second pivoting means when said double armed lever is turned by said operating means about said first pivoting means, a turnable mirror mounted on said other lever turnably together with the same, and a stationary mirror mounted on said base plate spaced from said turnable mirror and substantially parallel to the same; manually operable means for turning said cylindrical guiding sleeve; and an operating pin secured to said camera lens barrel projecting through said helical slot in said cylindrical guiding sleeve and engaging the other lever arm of said double armed lever, so that turning of said cylindrical guiding sleeve by said manually operable means will result in simultaneous adjustment of the position of said camera lens barrel in axial direction and adjustment of said range finder means by the intermediary of the operating member mounted on said camera lens barrel and engaging said other lever arm of said double armed lever while preventing turning of said camera lens barrel about its axis.

References Cited in the file of this patent

UNITED STATES PATENTS

| Number | Name | Date |
|---|---|---|
| 1,178,474 | Becker | Apr. 4, 1916 |
| 1,178,475 | Becker | Apr. 4, 1916 |
| 1,195,947 | Becker | Aug. 22, 1916 |
| 1,213,731 | Bornman | Jan. 23, 1917 |
| 1,760,827 | Goldhammer | May 27, 1930 |
| 1,768,315 | Goldhammer | June 24, 1930 |
| 1,858,385 | Barnack | May 17, 1932 |
| 2,041,632 | Barnack | May 19, 1936 |
| 2,066,605 | Billing | Jan. 5, 1937 |
| 2,096,815 | Leitz | Oct. 26, 1937 |
| 2,113,407 | Leitz et al. | Apr. 5, 1938 |
| 2,138,059 | Becker | Nov. 29, 1938 |
| 2,185,377 | Liebmann | Jan. 2, 1940 |
| 2,267,811 | Brownscombe | Dec. 30, 1941 |
| 2,302,584 | Steiner | Nov. 17, 1942 |
| 2,353,227 | Drotning | July 11, 1944 |
| 2,413,017 | Willcox | Dec. 24, 1946 |
| 2,420,018 | Semerau | May 6, 1947 |

FOREIGN PATENTS

| Number | Country | Date |
|---|---|---|
| 742,797 | France | Jan. 4, 1933 |
| 599,981 | Germany | July 12, 1934 |
| 610,395 | Germany | Jan. 8, 1936 |